US012756213B2

(12) United States Patent
Chang et al.

(10) Patent No.: US 12,756,213 B2
(45) Date of Patent: Oct. 6, 2026

(54) DRIVING CIRCUIT APPLIED TO PROTECTION SWITCH OF BATTERY MODULE

(71) Applicant: STL TECHNOLOGY CO., LTD., Kaohsiung City (TW)

(72) Inventors: Wen-Fan Chang, Kaohsiung City (TW); Chun-Chieh Li, Kaohsiung City (TW); Chun-Wei Ma, Kaohsiung City (TW); Chia-Chang Chen, Kaohsiung City (TW)

(73) Assignee: STL TECHNOLOGY CO., LTD., Kaohsiung City (TW)

( * ) Notice: Subject to any disclaimer, the term of this patent is extended or adjusted under 35 U.S.C. 154(b) by 867 days.

(21) Appl. No.: 18/125,139

(22) Filed: Mar. 23, 2023

(65) Prior Publication Data

US 2023/0411972 A1 Dec. 21, 2023

(30) Foreign Application Priority Data

Jun. 15, 2022 (TW) ................................ 111122291

(51) Int. Cl.

| | |
|---|---|
| ***H02J 7/60*** | (2026.01) |
| ***H01M 10/44*** | (2006.01) |
| ***H01M 10/48*** | (2006.01) |
| ***H02J 7/34*** | (2006.01) |
| ***H02J 7/64*** | (2026.01) |
| ***H02J 7/96*** | (2026.01) |

(52) U.S. Cl.
CPC ............ *H02J 7/663* (2026.01); *H01M 10/44* (2013.01); *H01M 10/441* (2013.01); *H01M 10/48* (2013.01); *H02J 7/342* (2020.01); *H02J 7/345* (2013.01); *H02J 7/64* (2026.01); *H02J 7/96* (2026.01); *H02J 2207/50* (2020.01)

(58) Field of Classification Search
CPC .... H01M 10/44; H01M 10/441; H01M 10/48; H02J 7/342; H02J 7/345; H02J 7/663; H02J 7/64; H02J 7/96
USPC ................................................. 320/134, 162
See application file for complete search history.

(56) References Cited

U.S. PATENT DOCUMENTS

2021/0273470 A1* 9/2021 Zhou ...................... H02J 7/865

OTHER PUBLICATIONS

European Search Opinion (Year: 2023).*

* cited by examiner

*Primary Examiner* — Julian D Huffman
*Assistant Examiner* — Ryu-Sung P. Weinmann
(74) *Attorney, Agent, or Firm* — HDLS IPR SERVICES; Chun-Ming Shih

(57) ABSTRACT

A driving circuit applied to a protection switch of a battery module is disclosed. The driving circuit includes a reverse switch, a non-reverse switch, a capacitor, and a storing energy component. The reverse switch or the non-reverse switch is turned on or off by a PWM signal. When the PWM signal is at a high level, the reverse switch is turned off, the non-reverse switch is turned on, and the capacitor is charged via a battery total voltage to form a storage voltage on the capacitor. When the PWM signal is at a low level, the reverse switch is turned on, the non-reverse switch is turned off, a reference voltage is connected to the capacitor via the reverse switch to form a boosted voltage superimposed by the reference voltage and the storage voltage. Afterwards, the boosted voltage can be used to drive the protection switch to be turned on.

10 Claims, 2 Drawing Sheets

DRIVING CIRCUIT APPLIED TO PROTECTION SWITCH OF BATTERY MODULE

This non-provisional application claims priority claim under 35 U.S.C. § 119(a) on Taiwan Patent Application No. 111122291 filed Jun. 15, 2022, the entire contents of which are incorporated herein by reference.

FIELD OF THE INVENTION

The disclosure relates to a circuit applied to drive a protection switch of a battery module.

BACKGROUND

With development of technology, electronic devices have gradually become necessary daily living articles. For facilitating the use of the electronic devices anytime and anywhere, many electronic devices are usually provided with a battery module inside. The electronic devices can operate by an energy provided by the battery module.

For the safety of the battery module, a protection switch is usually configured on a high side (such as positive electrode) of the battery module, so that the battery module can be electrically connected to the electronic device applied by the battery module via the protection switch. When the battery module is abnormal (such as over-current) or improperly used (such as the positive and negative electrodes of the battery are connected incorrectly), the charging or discharging of the battery module can be inhibited by controlling the protection switch to be turned off so as to avoid a damage to happen on the battery module.

MOS field effect transistor (such as N channel metal oxide semiconductor field effect transistor) is usually used as a protection switch of the battery module. In the past, the protection switch can be turned on by a driving of an integrated IC. The integrated IC applies a control signal greater than the battery total voltage of the battery to a gate of the protection switch so that the protection switch can be turned on by the control signal of the integrated IC, and therefore the battery module can operate in charging or discharging.

The integrated IC generally only provides a fixed driving current. If the integrated IC drives multiple parallel protection switches at the same time, the driving capability may be obviously insufficient. Besides, in order to increase the power supply time of the battery module, more and more battery cells are configured in the battery module, so that the battery total voltage of the battery module on the market often exceeds 100V. However, the driving voltage of integrated IC has a voltage limit (such as 75V) that is difficult to breakthrough due to the restriction of the characteristics of semiconductor materials. Therefore, the driving voltage of the generally integrated IC is easily lower than the battery total voltage of the battery module, so that it cannot drive the protection switch of the battery module.

SUMMARY

It is one objective of the disclosure to provide a driving circuit applied to drive a protection switch configured on a high-side of a battery module. The driving circuit includes a reverse switch, a non-reverse switch, a capacitor, a storing energy component, and a driving switch. When the driving circuit is in operating, the turning on or off of the reverse switch and the non-reverse switch can be controlled by a PWM signal so as to execute a charging to the capacitor or a superposition of a reference voltage and a storing voltage of the capacitor. When a superimposed voltage of the reference voltage and a storing voltage of the capacitor is greater than a battery total voltage of the battery module, it will obtain a boosted voltage higher than the battery total voltage from the storing energy component. Then, when the capacitor is further charged to make that the storing voltage of the capacitor is equal to the battery total voltage, it will obtain a final boosted voltage superimposed by the battery total voltage and the reference voltage. The final boosted voltage is higher than the sum of the battery total voltage and a threshold voltage of the protection switch. Afterwards, the final boosted voltage can become a gate driving voltage for driving the protection switch to be turned on.

It is one objective of the disclosure to provide a driving circuit, wherein when the driving circuit is in operating, it can superimpose a reference voltage higher than the threshold voltage of the protection switch on the basis of the total battery voltage so as to obtain the final boosted voltage. The final boosted voltage obtained is always higher than the sum of the battery total voltage and the threshold voltage of the protection switch. Therefore, even if the battery module is a battery module having a high battery total voltage, the driving circuit of the disclosure can always provide a gate driving voltage with an ultra-high voltage to drive the protection switch to be turned on.

To achieve the above objective, the present disclosure provide a driving circuit applied to a protection switch of a battery module, wherein the battery module is connected to the protection switch, the battery module is charged or discharged when the protection switch is turned on, the driving circuit including: a reverse switch; a non-reverse switch, wherein the reverse switch and the non-reverse switch are turned on or off by a controlling of a PWM signal; a first capacitor, provided with one end connected to a first node, and provided with another end connected to a second node, wherein the first capacitor, the reverse switch, and the non-reverse switch are connected together in the first node; a first diode, provided with a positive electrode connected to a battery total voltage, and provided with a negative electrode connected to the second node; a second diode, provided with a positive electrode connected to the second node, and provided with a negative electrode connected to a third node; a storing energy component, provided with one end connected to the third node, and provided with another end connected to the battery total voltage; and a driving switch, provide with a first end connected to the protection switch, provided with a second end connected to the third node, and provided with a control end connected to the battery total voltage, wherein the driving switch is a transistor switch; wherein when the PWM signal is at a high level state, the reverse switch will be turned off, the non-reverse switch will be turned on, the first capacitor is charged by the battery total voltage to form a storage voltage on the first capacitor; when the PWM signal is in a low level state, the reverse switch will be turned on, the non-reverse switch will be turned off, a reference voltage is connected to the first node via the reverse switch to form a superimposed voltage by a superimposition of the reference voltage and the storage voltage; when the superimposed voltage is higher than the battery total voltage, a boosted voltage higher than the battery total voltage will be formed on the storing energy component; when the storage voltage of the first capacitor is equal to the battery total voltage, a final boosted voltage superimposed by the battery total voltage and the reference voltage is formed on the storing energy component; afterwards, when the driving switch is turned on, the final boosted voltage will be used to drive the protection switch to be turned on via the driving switch.

In one embodiment of the disclosure, the protection switch is an N channel metal oxide semiconductor field effect transistor configured on a high side of the battery module.

In one embodiment of the disclosure, the driving switch is a P channel metal oxide semiconductor field effect transistor or a PNP bipolar junction transistor.

In one embodiment of the disclosure, the final boosted voltage is higher than a sum of the battery total voltage and a threshold voltage of the protection switch.

In one embodiment of the disclosure, when a voltage difference between the final boosted voltage and the battery total voltage is larger than a threshold voltage of the driving switch, the driving switch will be turned on.

In one embodiment of the disclosure, the reverse switch includes a first switch, a second switch, and a third switch; the first switch, the second switch, and the third switch are all the transistor switches; the first switch is provided with a first end connected to the reference voltage, provided with a second end connected to a grounding, and provided with a control end for receiving the PWM signal; the second switch is provided with a first end connected to the grounding, provided with a second end connected to the reference voltage, and provided with a control end connected to the first end of the first switch; the third switch is provided with a first end connected to the first node, provided with a second end connected to the reference voltage, and provided with a control end connected to the first end of the second switch; when the PWM signal is at the high level state, the first switch will be turned on, the second switch will be turned on, and the third switch will be turned off; when the PWM signal is at the low level state, the first switch will be turned off, the second switch will be turned off, and the third switch will be turned on.

In one embodiment of the disclosure, the first switch is an N channel metal oxide semiconductor field effect transistor or an NPN bipolar junction transistor, and the second switch and the third switch are P channel metal oxide semiconductor field effect transistors or PNP bipolar junction transistors, respectively.

In one embodiment of the disclosure, the non-reverse switch is the transistor switch; the non-reverse switch is provided with a first end connected to the first node, provided with a second end connected to a grounding, and provided with a control end for receiving the PWM signal; when the PWM signal is at the high level state, the non-reverse switch will be turned on; when the PWM signal is at the low level state, the non-reverse switch will be turned off.

In one embodiment of the disclosure, the non-reverse switch is an N channel metal oxide semiconductor field effect transistor or an NPN bipolar junction transistor.

In one embodiment of the disclosure, the driving circuit further includes a voltage regulator connected to the battery total voltage, and used to generate the reference voltage by regulating the battery total voltage.

DETAILED DESCRIPTION OF THE PREFERRED EMBODIMENTS

Figure 1:
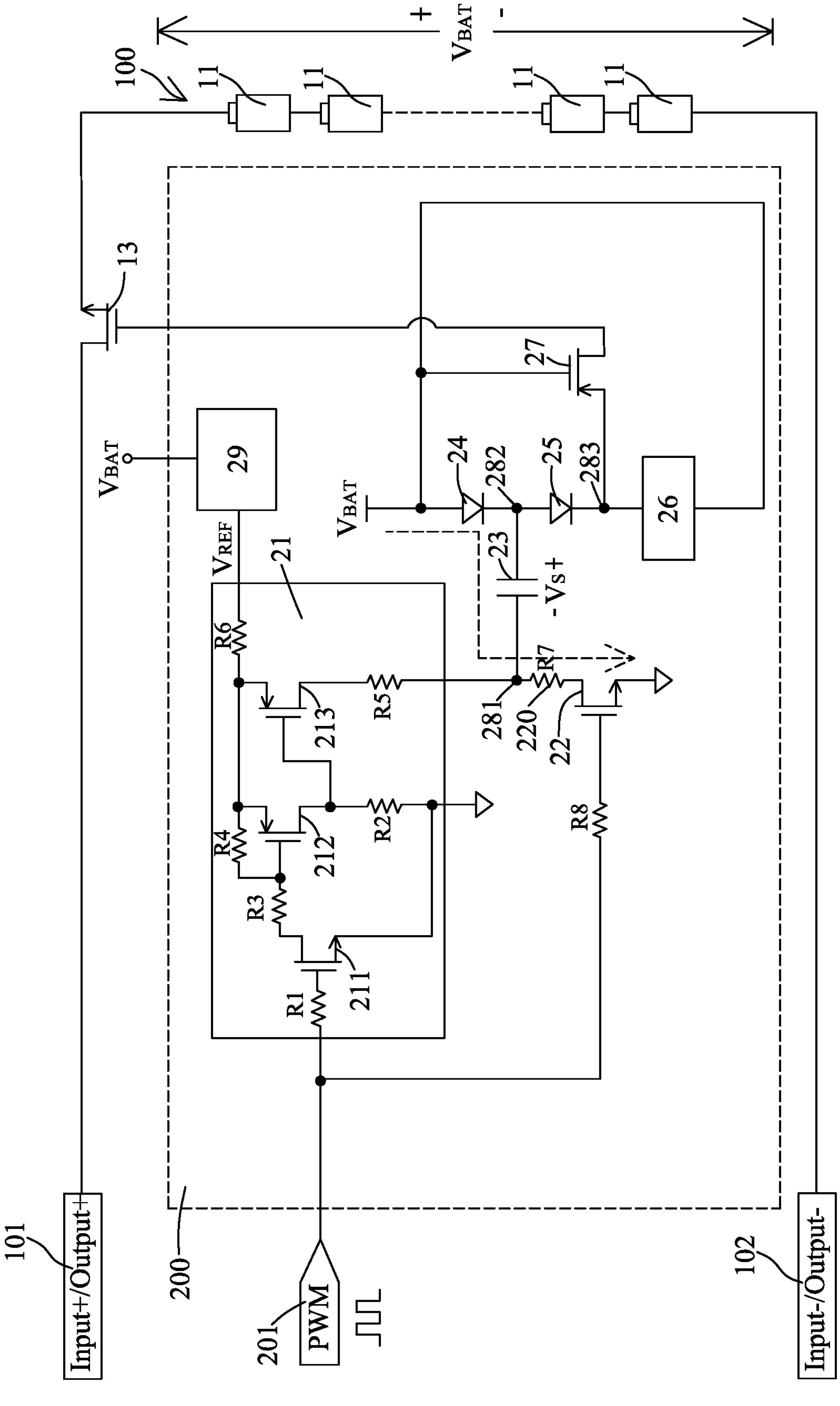
FIG. 1 is a circuit diagram of a driving circuit of the disclosure operating in PWM signal to be at a high level state.
Figure 2:
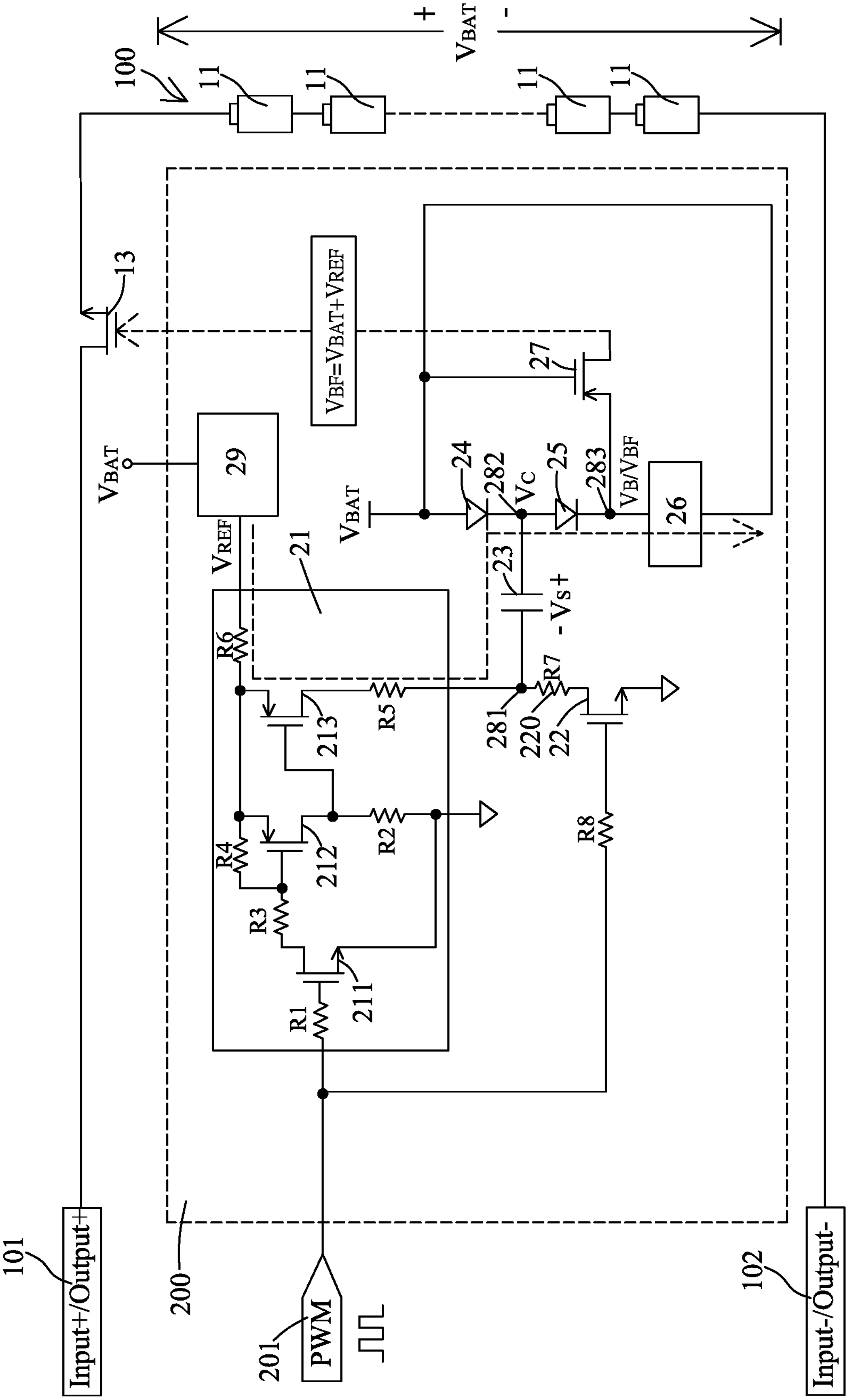
FIG. 2 is a circuit diagram of the driving circuit of the disclosure operating in PWM signal to be at a low level state.

Referring to FIG. 1 and FIG. 2, there are shown a circuit diagram of a driving circuit of the disclosure operating in PWM signal to be at a high level state, and a circuit diagram of the driving circuit of the disclosure operating in PWM signal to be at a low level state. The driving circuit of the disclosure is applied to a battery module, and used to control the switching of the protection switch of the battery module. As shown in FIG. 1, the battery module 100 includes a plurality of battery cells 11. Those battery cells 11 are connected in series to form a battery total voltage $V_{BAT}$. The battery module 100 is provided with a positive electrode connected to a positive input/output 101, and provided with a negative electrode connected to a negative input/output 102. A protection switch 13 is configured on a high side of the battery module 100. For example, the protection switch 13 is configured between the positive input/output 101 and the positive electrode of the battery module 100. In the disclosure, the protection switch 13 is a transistor switch, for example, N channel metal oxide semiconductor field effect transistor.

The driving circuit 200 includes a reverse switch 21, a non-reverse switch 22, a first capacitor 23, a first diode 24, a second diode 25, a storing energy component 26, and a driving switch 27. The driving circuit 200 receives a PWM signal 201, and controls the turning on or off of the reverse switch 21 and the non-reverse switch 22 by the PWM signal 201. The PWM signal 201 is generated by a battery management system (BMS) or a power management chip. When the PWM signal 201 is at a high level state, the reverse switch will be turned off, and the non-reverse switch will be turned on. When the PWM signal 201 is at a low level state, the reverse switch will be turned on, and the non-reverse switch will be turned off.

The reverse switch 21 includes a first switch 211, a second switch 212, and a third switch 213. The first switch 211, the second switch 212, and the third switch 213 are all the transistor switches. The first switch 211 is an N channel metal oxide semiconductor field effect transistor or NPN bipolar junction transistor, and the second switch 212 and the third switch 213 are P channel metal oxide semiconductor field effect transistors or PNP bipolar junction transistors, respectively. The first switch 211 is provided with a first end (such as drain electrode or collector electrode) connected to a reference voltage $V_{REF}$, provided with a second end (such as source electrode or emitter electrode) connected to a grounding, and provided with a control end (such as gate electrode or base electrode) for receiving the PWM signal 201 via a first resistor R1. The second switch 212 is provided with a first end (such as drain electrode or collector electrode) connected to the grounding via a second resistor R2, provided with a second end (such as source electrode or emitter electrode) connected to the reference voltage $V_{REF}$, and provided with a control end (such as gate electrode or base electrode) connected to the first end of the first switch 211 via a third resistor R3 and connected to the second end of the second switch 212 via a fourth resistor R4. The third switch 213 is provided with a first end (such as drain electrode or collector electrode) connected to a first node 281 via a fifth resistor R5, provided with a second end (such as source electrode or emitter electrode) connected to the reference voltage $V_{REF}$ via a sixth resistor R6, and provided with a control end (such as gate electrode or base electrode) connected to the first end of the second switch 212.

Besides, the non-reverse switch 22 is a single transistor switch, which can be an N channel metal oxide semiconductor field effect transistor or an NPN bipolar junction transistor. The non-reverse switch 22 is provided with a first end (such as drain electrode or collector electrode) connected to the first node 281 via a seventh resistor R7, provided with a second end (such as source electrode or emitter electrode) connected to the grounding, and provided with a control end (such as gate electrode or base electrode) for receiving the PWM signal 210 via an eighth resistor R8.

The first capacitor 30 is provided with one end connected to the first node 281, and provided with another end of a second node 282. The first capacitor 30, the reverse switch 21, and the non-reverse switch 22 are connected in the first node 281. The first diode 24 is provided with a positive electrode connected to the battery total voltage $V_{BAT}$, and provided with a negative electrode connected to the second node 282. The second diode 25 is provided with a positive electrode connected to the second node 282, and provided with a negative electrode connected to a third node 283. The storage energy component 26 is composed of at least one capacitor, provided with one end connected to the third node 283, and provided with another end connected to the battery total voltage $V_{BAT}$. The driving switch 27 is also a transistor switch, which can be a P channel metal oxide semiconductor field effect transistor or a PNP bipolar junction transistor. The driving switch 27 is provided with a first end (such as drain electrode or collector electrode) connected to the protection switch 13, provided with a second end (such as source electrode or emitter electrode) connected to the third end 283, and provided with a control end connected to the battery total voltage $V_{BAT}$. Besides, the driving circuit 200 further includes a voltage regulator 29, for example, voltage converter. The voltage regulator 29 is connected to the battery module 100, and generates the reference voltage $V_{REF}$ by regulating the battery total voltage $V_{BAT}$. For example, the voltage regulator 29 converts the battery total voltage above 100V into the reference voltage of 12V. In the disclosure, the reference voltage $V_{REF}$ is greater than or equal to a threshold voltage $V_{TH}$ (such as $V_{GS}$) of the protection switch 13.

Specifically, when the driving circuit 200 is in operating, it will receive the PWM signal 201. As shown in FIG. 1, when the PWM signal 201 is at the high level state, the first switch 211 of the reverse switch 21 will be turned on, the second switch 212 of the reverse switch 21 will be turned on, the third switch 213 of the reverse switch 21 will be turned off, and the non-reverse switch 22 will be turned on; the first capacitor 23 is charged by the battery total voltage $V_{BAT}$ to form a storage voltage $V_S$ on the first capacitor 23. As shown in FIG. 2, when the PWM signal 201 is in the low level state, the first switch 211 of the reverse switch 21 will be turned off, the second switch 212 of the reverse switch 21 will be turned off, the third switch 213 of the reverse switch 21 will be turned on, and the non-reverse switch 22 will be turned off; the reference voltage $V_{REF}$ is electrically connected to the first node 281 via the third switch 213 turned on to form a superimposed voltage $V_C$ on the first node 281. The superimposed voltage $V_C$ is formed by a superimposition of the storing voltage $V_S$ and the reference voltage $V_{REF}$, for example, $V_C=V_S+V_{REF}$.

The state of the PWM signal 201 is repeatedly switched between the high level state and the low level state, the first capacitor 23 is continuously charged by the battery total voltage $V_{BAT}$. Afterwards, when the voltage $V_C$ on the second node 282 is higher than the battery total voltage $V_{BAT}$, a boosted voltage $V_B$ will be formed on the storing energy component 26, for example, $V_B=V_S+V_{REF}$.

The state of the PWM signal 201 continues to be repeatedly switched between the high level state and the low level state, the first capacitor 23 is continuously charged by the battery total voltage $V_{BAT}$ to make that the storing voltage $V_S$ of the first capacitor 23 is equal to the battery total voltage $V_{BAT}$. Then, the reference voltage $V_{REF}$ is superimposed on the storing voltage $V_S$ equal to the battery total voltage $V_{BAT}$ to form the superimposed voltage $V_C=V_{BAT}+V_{REF}$, and form a final boosted voltage $V_{BF}=V_{BAT}+V_{REF}$ on the storing energy component 26.

After the final boosted voltage $V_{BF}=V_{BAT}+V_{REF}$ is formed on the storing energy component 26, a voltage difference $V_d=V_{REF}$ between the final boosted voltage $V_{BF}$ and the battery total voltage $V_{BAT}$ will be greater than the threshold voltage $V_{TH}$ (such as $V_{SG}$) of the driving switch 27 to make that the driving switch 27 can be turned on. Afterwards, the final boosted voltage $V_{BF}$ becomes a gate driving voltage for the protection switch 13, and is used for driving the protection switch 13 to be turned on via the driving switch 27.

As the above description, the driving circuit 200 can execute the charging of the first capacitor 23 or the superimposing of the reference voltage $V_{REF}$ and the storing voltage $V_S$ by controlling the turning on or off of the switches 21, 22. Besides, when the voltage $V_C$ obtained from the superimposition of the reference voltage $V_{REF}$ and the storing voltage $V_S$ of the first capacitor 23 is higher than the battery total voltage $V_{BAT}$, it will obtain a boosted voltage $V_B$ higher than the battery total voltage $V_{BAT}$ from the storing energy component 26. Then, when the first capacitor 23 is further charged to make that the storage voltage $V_S$ is equal to the battery total voltage $V_{BAT}$, it will obtain the final boosted voltage $V_{BF}$ superimposed by the reference voltage $V_{REF}$ and the battery total voltage $V_{BAT}$ from the storing energy component 26. The final boosted voltage $V_{BF}$ will be higher than the sum of the battery total voltage $V_{BAT}$ and the threshold voltage $V_{TH}$, and therefore the final boosted voltage $V_{BF}$ can become the gate driving voltage for driving the protection switch 13 to be turned on.

Accordingly, the driving circuit 200 of the disclosure in operating can superimpose a reference voltage $V_{REF}$ higher than the threshold voltage $V_{TH}$ of the protection switch 13 on the basis of the total battery voltage $V_{BAT}$ so as to obtain the final boosted voltage $V_{BF}$. The final boosted voltage $V_{BF}$ obtained is always higher than the sum of the battery total voltage $V_{BAT}$ and the threshold voltage $V_{TH}$ of the protection switch 13. Thus, even if the battery module 100 is having an ultra-high battery total voltage, the driving circuit 200 of the disclosure can also always provide the gate driving voltage higher than the ultra-high battery total voltage so that the protection switch 13 can be turned on by the gate driving voltage, successfully.

In a preferred embodiment of the disclosure, the first capacitor 23 and the storing energy component 26 can select large-capacity capacitors as their electric storage elements, and the reverse switch 21 and the non-reverse switch 22 can select transistors with high voltage resistance as their switch elements. Thus, the driving circuit 200 of the disclosure can be applied to drive the protection switch 13 of the battery module 100 having the ultra-high voltage.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A driving circuit applied to a protection switch of a battery module, wherein the battery module is connected to the protection switch, the battery module is charged or discharged when the protection switch is turned on, the driving circuit including:

a reverse switch;

a non-reverse switch, wherein the reverse switch and the non-reverse switch are turned on or off by a controlling of a PWM signal;

a first capacitor, provided with one end connected to a first node, and provided with another end connected to a second node, wherein the first capacitor, the reverse switch, and the non-reverse switch are connected together in the first node;

a first diode, provided with a positive electrode connected to a battery total voltage, and provided with a negative electrode connected to the second node;

a second diode, provided with a positive electrode connected to the second node, and provided with a negative electrode connected to a third node;

a storing energy component, provided with one end connected to the third node, and provided with another end connected to the battery total voltage; and a driving switch, provided with a first end connected to the protection switch, provided with a second end connected to the third node, and provided with a control end connected to the battery total voltage, wherein the driving switch is a transistor switch;

wherein when the PWM signal is at a high level state, the reverse switch will be turned off, the non-reverse switch will be turned on, the first capacitor is charged by the battery total voltage to form a storage voltage on the first capacitor; when the PWM signal is in a low level state, the reverse switch will be turned on, the non-reverse switch will be turned off, a reference voltage is connected to the first node via the reverse switch to form a superimposed voltage by a superimposition of the reference voltage and the storage voltage; when the superimposed voltage is higher than the battery total voltage, a boosted voltage higher than the battery total voltage will be formed on the storing energy component; when the storage voltage of the first capacitor is equal to the battery total voltage, a final boosted voltage superimposed by the battery total voltage and the reference voltage is formed on the storing energy component; afterwards, when the driving switch is turned on, the final boosted voltage will be used to drive the protection switch to be turned on via the driving switch.

2. The driving circuit according to claim 1, wherein the protection switch is an N channel metal oxide semiconductor field effect transistor configured on a high side of the battery module.

3. The driving circuit according to claim 1, wherein the driving switch is a P channel metal oxide semiconductor field effect transistor or a PNP bipolar junction transistor.

4. The driving circuit according to claim 1, wherein the final boosted voltage is higher than a sum of the battery total voltage and a threshold voltage of the protection switch.

5. The driving circuit according to claim 1, wherein when a voltage difference between the final boosted voltage and the battery total voltage is larger than a threshold voltage of the driving switch, the driving switch will be turned on.

6. The driving circuit according to claim 1, wherein the reverse switch includes a first switch, a second switch, and a third switch; the first switch, the second switch, and the third switch are all transistor switches; the first switch is provided with a first end connected to the reference voltage, provided with a second end connected to a grounding, and provided with a control end for receiving the PWM signal; the second switch is provided with a first end connected to the grounding, provided with a second end connected to the reference voltage, and provided with a control end connected to the first end of the first switch; the third switch is provided with a first end connected to the first node, provided with a second end connected to the reference voltage, and provided with a control end connected to the first end of the second switch; when the PWM signal is at the high level state, the first switch will be turned on, the second switch will be turned on, and the third switch will be turned off; when the PWM signal is at the low level state, the first switch will be turned off, the second switch will be turned off, and the third switch will be turned on.

7. The driving circuit according to claim 6, wherein the first switch is an N channel metal oxide semiconductor field effect transistor or an NPN bipolar junction transistor, and the second switch and the third switch are P channel metal oxide semiconductor field effect transistors or PNP bipolar junction transistors, respectively.

8. The driving circuit according to claim 1, wherein the non-reverse switch is a transistor switch; the non-reverse switch is provided with a first end connected to the first node, provided with a second end connected to a grounding, and provided with a control end for receiving the PWM signal; when the PWM signal is at the high level state, the non-reverse switch will be turned on; when the PWM signal is at the low level state, the non-reverse switch will be turned off.

9. The driving circuit according to claim 8, wherein the non-reverse switch is an N channel metal oxide semiconductor field effect transistor or an NPN bipolar junction transistor.

10. The driving circuit according to claim 1, wherein the driving circuit further includes a voltage regulator connected to the battery total voltage, and used to generate the reference voltage by regulating the battery total voltage.

* * * * *